United States Patent
Cohen et al.

(10) Patent No.: US 7,634,108 B2
(45) Date of Patent: Dec. 15, 2009

(54) AUTOMATED FACE ENHANCEMENT

(75) Inventors: Michael Cohen, Seattle, WA (US); Jue Wang, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 596 days.

(21) Appl. No.: 11/353,799

(22) Filed: Feb. 14, 2006

(65) Prior Publication Data

US 2007/0189627 A1   Aug. 16, 2007

(51) Int. Cl.
*G06K 9/00* (2006.01)
*G06K 9/40* (2006.01)

(52) U.S. Cl. ............................. 382/103; 382/254

(58) Field of Classification Search ........... 382/118, 382/254
See application file for complete search history.

(56) References Cited

U.S. PATENT DOCUMENTS

| | | | |
|---|---|---|---|
| 6,437,808 B1* | 8/2002 | Brill et al. | 715/765 |
| 2002/0126891 A1* | 9/2002 | Osberger | 382/165 |
| 2003/0053685 A1* | 3/2003 | Lestideau | 382/164 |
| 2003/0081836 A1* | 5/2003 | Averbuch et al. | 382/199 |
| 2003/0108225 A1* | 6/2003 | Li | 382/118 |
| 2003/0235344 A1* | 12/2003 | Kang et al. | 382/284 |
| 2004/0013291 A1* | 1/2004 | Hillman | 382/128 |
| 2004/0081340 A1* | 4/2004 | Hashimoto | 382/128 |
| 2004/0170337 A1* | 9/2004 | Simon et al. | 382/254 |

OTHER PUBLICATIONS

Black, M. J., and P. Anandan, The robust estimation of multiple motions: Parametric and piecewise-smooth flow fields, *Comp. Vision and Image Understanding*, 1996 vol. 63, No. 1, pp. 75-104.

Comaniciu, D., and P. Meer, Mean shift: a robust approach toward a feature space analysis, IEEE Trans. on Pattern Analysis and Mach. Intelligence, 2002, vol. 24, pp. 603-619.

Cootes, T., G. Edwards, and C. Taylor, Active appearance models, *IEEE Trans. Pattern Analysis and Mach. Intelligence*, 2001, vol. 23, No. 6, pp. 681-685.

Hu, C., R. Feris, and M. Turk, Real-time view-based face alignment using active wavelet networks, *Proc. IEEE Int'l. Workshop on Analysis and Modeling of Face and Gestures*, 2003, pp. 215-221.

Jones, M. J., and J. M. Rehg, Statistical color models with application to skin detection, *International J. of Comp. Vision*, 2002, vol. 46, No. 1, pp. 81-96.

Li, S., X. Zou, Y. Hu, Z. Zhang, S. Yan, X. Peng, L. Huang, and H. Zhang, Real-time multi-view face detection, tracking, pose estimation, alignment, and recognition, 2001, *IEEE CVPR Demo Summary*.

(Continued)

*Primary Examiner*—Bhavesh M Mehta
*Assistant Examiner*—Nirav G Patel
(74) *Attorney, Agent, or Firm*—Lyon & Harr, LLP; Katrina A. Lyon

(57) ABSTRACT

An automated face enhancement system and process which can automatically improve faces in videos or other images by applying cosmetic effects, given only a small amount of user interaction for initialization. For an input video, the system will first track the face and eye locations, and classify pixels in the face into different facial components based on local color models. The classification results of different frames are temporally smoothed to ensure temporal coherence. A set of cosmetic filters are then applied to different facial components.

19 Claims, 9 Drawing Sheets

OTHER PUBLICATIONS

Liu, Z., Z. Zhang, and Y. Shan, Expressive expression mapping with ratio images, *Proc. of ACM SIGGRAPH*, 2001, pp. 271-276.

Liu, Z., Z. Zhang and Y. Shan, Image-based surface detail transfer, *IEEE Computer Graphics and Applications*, 2004, vol. 24, No. 3, pp. 30-35.

Numata, K., K. Ri and K. Kira, "E-Make" A real-time HD skin-make-up machine, 2001.

Tomasi, C., and R. Manduchi, Bilateral filtering for gray and color images, *Proc. of IEEE Int'l. Conf on Comp. Vision*, 1998.

Tsumura, N., N. Ojima, K. Sato, M. Shiraishi, H. Shimizu, H. Nabeshima, S. Akazaki, K. Hori and Y. Miyake, Image-based skin color and texture analysis/synthesis by extracting hemoglobin and melanin information in the skin, *ACM Trans. on Graphics*, 2003, vol. 22, No. 3, pp. 770-779.

Viola, P., and M. J. Jones, Rapid object detection using a boosted cascade of simple features, *Proc. of IEEE Conf. on Comp. Vision and Pattern Recognition*, 2001.

Yeasin, M., and Y. Kuniyoshi, Detecting and tracking human face and eye using space-varying sensor and an active vision head, *Proc. of IEEE Conf. on Comp. Vision and Pattern Recognition*, 2000.

* cited by examiner

AUTOMATED FACE ENHANCEMENT

BACKGROUND

Due to hardware constraints, teleconferencing videos captured by web cameras typically experience significant imaging noise. Additionally, illumination conditions pose a severe problem. With usual lighting conditions in an office, a single light source on the ceiling may leave significant shadows and highlights on a speaker's face, as shown in the example frame in FIG. 1A. These problems result in unsatisfactory images of the speaker, which have prevented many people from using teleconferencing systems. Given the fact that imaging hardware and lighting conditions are not easy to improve, the post-processing of teleconferencing videos in appropriate ways to improve the quality of faces in image frames becomes a practical means to solve these problems.

Previous approaches to post processing of teleconferencing videos have tried to apply cosmetic effects to the face in a single photograph or image frame. To achieve good results, these earlier systems required manual registration between the target face being enhanced or improved, as well as training examples.

The reproduction of human skin color and texture is an important function of various imaging systems. Some "E-make" functions have been proposed which transform how the skin appears by producing aging or reverse aging effects. Furthermore, hemoglobin and melanin information in the skin has been extracted for designing E-cosmetic functions to realistically change the skin color and texture in the images. These techniques generally require high quality face images as input and only aim at simulating subtle or natural changes in skin color, and thus are not capable of eliminating significant noise and strong shadows presented in teleconferencing videos.

Example-based approaches have been proposed to transfer special effects between faces. In one case, an illumination change of one person's expression is captured by an expression ratio image (ERI), which is then mapped to any other person's face image to generate more expressive facial expressions. An image-based surface detail transfer technique has been used to produce aging effects or as a touchup tool to remove wrinkles and color spots on the face images. However, these techniques require manual registration between a target face image and training images.

Applying cosmetic effects separately on each frame may result in temporally incoherent enhanced video sequences. To avoid this problem, a robust facial component classification and tracking system is essential. Recent advances in face detection and tracking make it possible to robustly track the face in video sequences in real-time. In terms of facial components, generic statistical skin and non-skin color models have been proposed to detect skin regions in images. Neural networks, active wavelet networks, active appearance models (AAM) and a variety of other techniques have been applied for automatic face alignment. However, none of these techniques can generate pixel-level classification results which are necessary to provide robust and realistic looking enhancement of video frames.

SUMMARY

An automated face enhancement system and process, which can efficiently apply cosmetic effects to improve the faces in a video sequence or any other image, given a very small amount of user interaction, is presented.

As shown in FIG. 1B, after applying digital cosmetic effects to the image shown in FIG. 1A using the automated face enhancement system and process, the face has been significantly improved by noise reduction, shadow removal and color correction. In general, the automated face enhancement system and technique combines face tracking, skin detection, eye tracking and local color model-based pixel classification techniques together to classify pixels into different facial components for further cosmetic filtering.

The automated face enhancement system can efficiently apply cosmetic effects on faces in an input video sequence after model initialization. In one embodiment, the automated face enhancement system and technique uses a rule-based filtering approach in which a user only sets up proper makeup rules instead of providing makeup examples. For example, the user can mark a few regions on the first frame and choose the combination and strengths of cosmetic filters. The system thus can automatically apply the user specified effects in the entire video with temporal coherence. After initialization, in one embodiment, for an input video, the system will first track the face and eye locations, and classify pixels on the face into different facial components based on local color models, using the locations of the face and eyes. The classification results of different frames are temporally smoothed. A set of cosmetic filters are then softly applied to different facial components.

It is noted that while the foregoing limitations in existing video conferencing systems described in the Background section can be resolved by a particular implementation of the automated face enhancement system according to the present invention, this system and process is in no way limited to implementations that just solve any or all of the noted disadvantages. Rather, the present system and process has a much wider application as will become evident from the descriptions to follow.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the automated face enhancement system will become better understood with regard to the following description, appended claims, and accompanying drawings where:

DETAILED DESCRIPTION

In the following description of the preferred embodiments of the present automated face enhancement system, reference is made to the accompanying drawings that form a part hereof, and in which is shown by way of illustration specific embodiments in which the automated face enhancement system may be practiced. It is understood that other embodiments may be utilized and structural changes may be made without departing from the scope of the present automated face enhancement system.

1.0 Exemplary Operating Environment

Figure 1A:
FIG. 1A depicts a speaker's face in an original video frame that has not been enhanced.
Figure 1B:
FIG. 1B depicts the face shown in FIG. 1A after it has been enhanced by one embodiment of the present automated face enhancement system. The system coherently applies the same cosmetic effects through the entire video sequence.

FIG. 1 illustrates an example of a suitable computing system environment 100 on which the automated face enhancement system may be implemented. The computing system environment 100 is only one example of a suitable computing environment and is not intended to suggest any limitation as to the scope of use or functionality of the automated face enhancement system. Neither should the computing environment 100 be interpreted as having any dependency or requirement relating to any one or combination of components illustrated in the exemplary operating environment 100.

The automated face enhancement system is operational with numerous other general purpose or special purpose computing system environments or configurations. Examples of well known computing systems, environments, and/or configurations that may be suitable for use with the automated face enhancement system include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The automated face enhancement system may be described in the general context of computer-executable instructions, such as program modules, being executed by a computer. Generally, program modules include routines, programs, objects, components, data structures, etc. that perform particular tasks or implement particular abstract data types. The automated face enhancement system may also be practiced in distributed computing environments where tasks are performed by remote processing devices that are linked through a communications network. In a distributed computing environment, program modules may be located in both local and remote computer storage media including memory storage devices.

Figure 2:
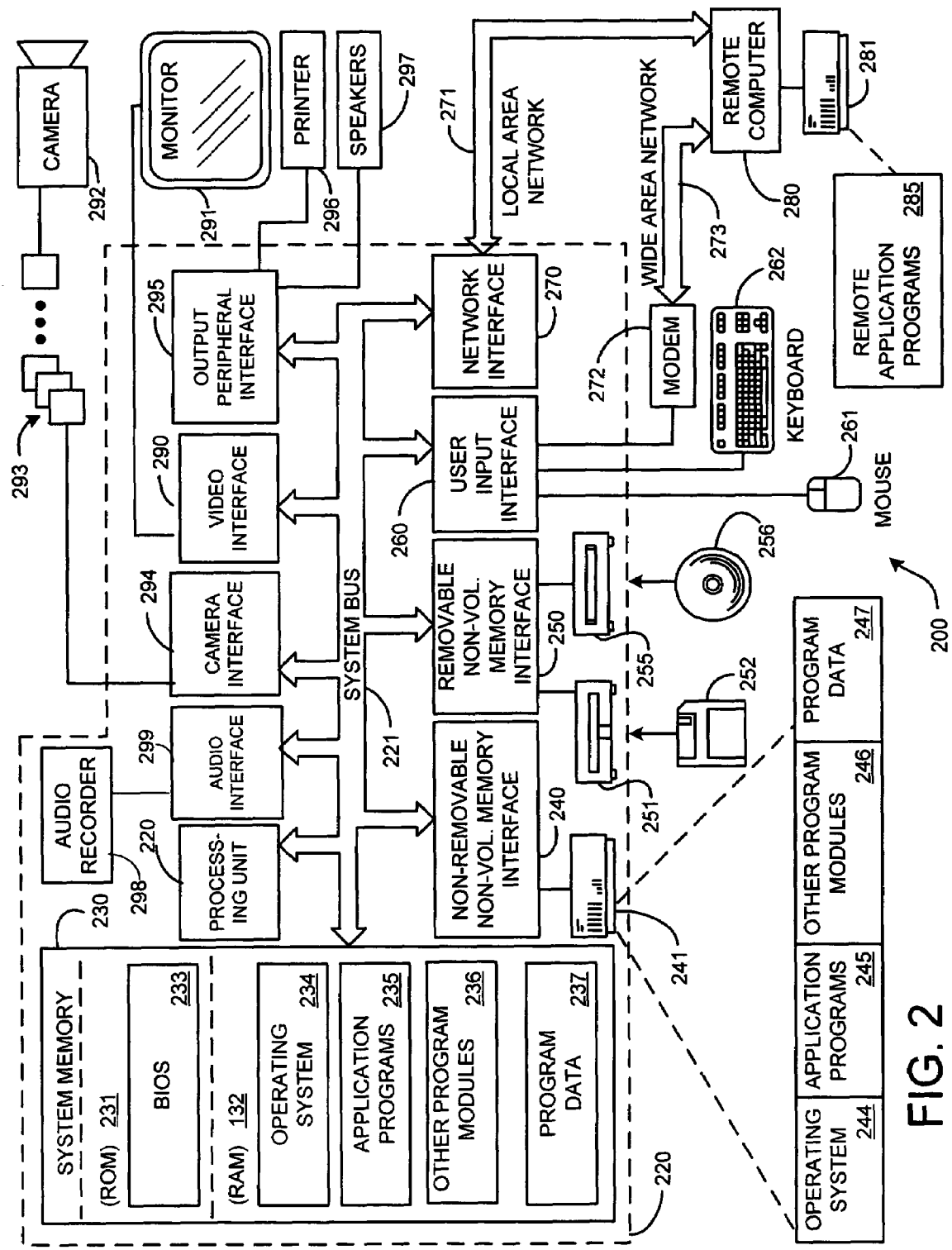
FIG. 2 is a diagram depicting a general purpose computing device constituting an exemplary system for implementing the automated face enhancement system.

With reference to FIG. 2, an exemplary system for implementing the automated face enhancement system includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through anon-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295. Of particular significance to the present automated face enhancement system, a camera 292 (such as a digital/electronic still or video camera, or film/photographic scanner) capable of capturing a sequence of images 293 can also be included as an input device to the personal computer 210. Further, while just one camera is depicted, multiple cameras could be included as an input device to the personal computer 210. The images 293 from the one or more cameras are input into the computer 210 via an appropriate camera interface 294. This interface 265 is connected to the system bus 221, thereby allowing the images to be routed to and stored in the RAM 232, or one of the other data storage devices associated with the computer 210. However, it is noted that image data can be input into the computer 210 from any of the aforementioned computer-readable media as well, without requiring the use of the camera 292. An audio recorder 298 can also be connected to the computer via an audio interface device 299 for the purpose of capturing audio data.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

The exemplary operating environment having now been discussed, the remaining parts of this description section will be devoted to a description of the program modules embodying the automated face enhancement system and process.

2.0 Automated Face Enhancement.

Figure 3:
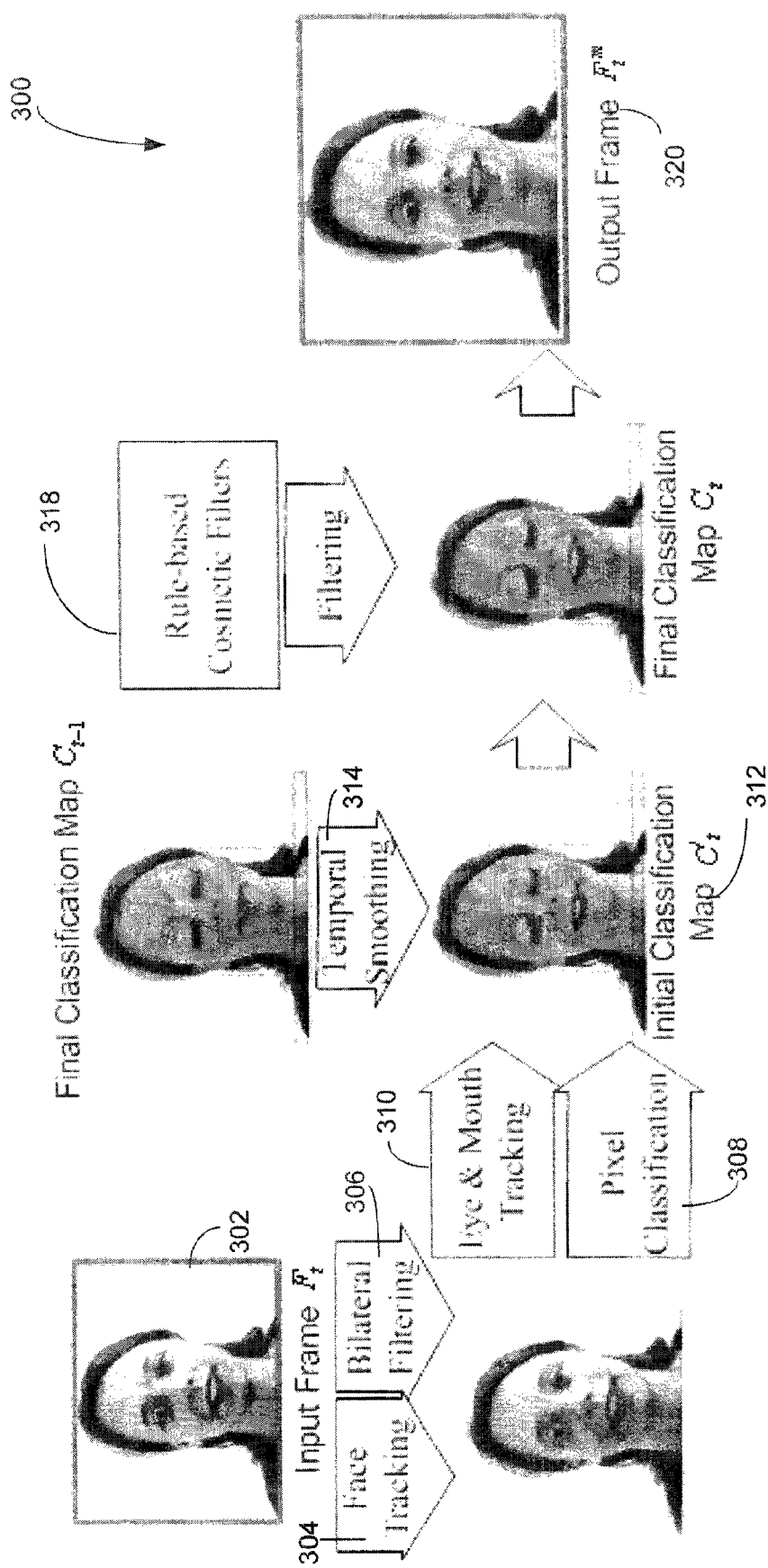
FIG. 3 depicts a general diagram of one embodiment of the automated face enhancement system.

In general, an overview of one embodiment of the automated face enhancement system is illustrated in FIG. 3. Given an input frame $F_t$ 302, the automated face enhancement system 300 first applies an efficient conventional face tracking module 304 to locate a rectangular box containing the face. To eliminate image noise, the automated face enhancement system in one embodiment applies Gaussian bilateral filters 306 both inside and outside the face bounding box with different filter parameters. Bilateral filtering smoothes images while preserving edges by means of a nonlinear combination of nearby image values. Inside the face region, the automated face enhancement system uses smaller spatial and range Gaussian kernels to eliminate the image noise while keeping fine details of the face.

The automated face enhancement system then classifies each pixel inside the face bounding box into different facial components. To do this the system 300 first uses a pixel classification module 308 to examine every pixel inside the face bounding box by using pre-trained local skin color models to calculate the pixel's probability of belonging to the skin region. In addition, the system applies a template-based eye tracking module 310 inside the face bounding box to locate the positions of eyes, but only considers non-skin pixels in this eye-tracking, thus reducing computational time. The automated face enhancement system also uses this eye tracking module 310 to roughly determine the mouth position based on eye positions. For pixels inside the face bounding box which include the eyes and the mouth, the automated face enhancement system again applies pre-trained local color models to calculate their probabilities of belonging to different facial components such as eyes, eyebrows, shadows underneath the eyes and lips. In this way the automated face enhancement system calculates an initial classification map $C'_t$ 312 based only on the current frame. The details of building a classification map are discussed further in Section 2.2.3.

Directly applying makeup effects separately on each frame may result in a jittering video. Thus in one embodiment, the automated face enhancement system first applies a temporal smoothing operation 314 between the initial classification map $C'_t$ for the current frame and the final classification map of the previous frame $C_{t-1}$, which will generate a temporally coherent final classification map $C_t$ 316 for $F_t$, the current frame. The temporal smoothing will be discussed in detail in Section 2.3. The automated face enhancement system then applies a set of pre-defined cosmetic filters on different facial components via a filter module 318 to render the enhanced output frame 320, as will be further described in Section 2.4.

Figure 4:
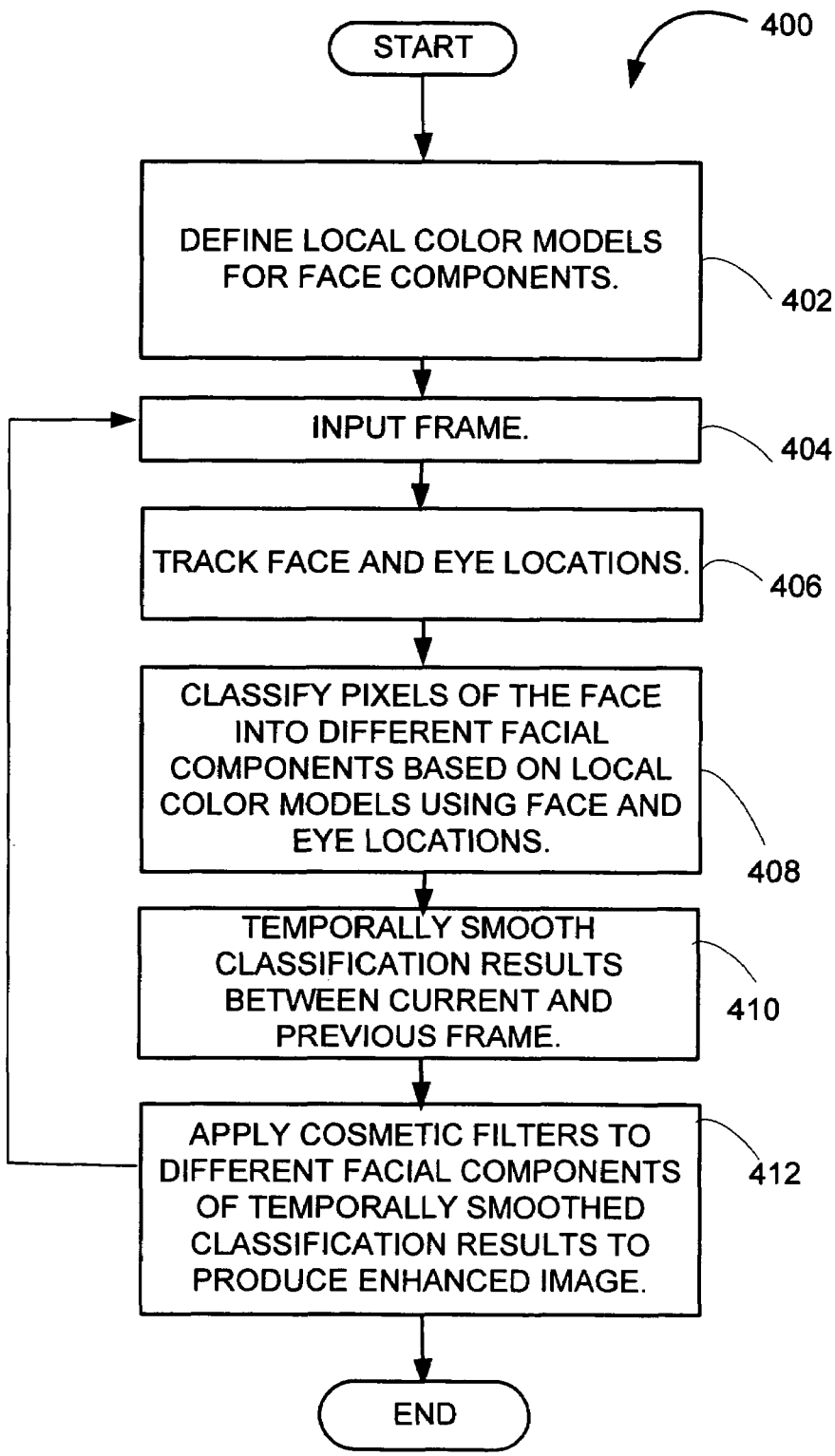
FIG. 4 depicts a general flow diagram of the automated face enhancement process.

The general process 400 employed by the automated face enhancement system is shown in FIG. 4. As shown in process action 402, the automated face enhancement system is first initialized. In one embodiment this involves specifying regions in the first frame of an image sequence which are to be used as templates for training local color models for facial components and training these color models. Alternately, known local color models can simply be specified for each of the facial components. For example, these facial components can be the eye brow and lip regions. Additionally, the desired make-up effects can be chosen during initialization of the system. This will be discussed in more detail in Section 2.1.

Once the system has been initialized, the next frame is input, as shown in process action 404. As shown in process action 406, the face and eye locations are tracked using a face detector and by determining skin/non-skin regions. In the non-skin regions inside the face bounding box, eye templates are used to track the eyes. Once the eye positions are known they are used to help locate other facial components such as, for example, the mouth. The pixels in the face region are then classified into different facial components based on local color models to create an initial classification map for this frame (process action 408). These classification results for this frame are then temporally smoothed with a final classification map of the previous frame, resulting in a final classification map for the current frame (process action 410). Cosmetic filters are then applied to the different facial components based on the final classification map of this current frame to render the enhanced output image, as shown in process action 412. This process repeats for subsequent frames of the image or video sequence.

2.1 Initialization.

To initialize the automated face enhancement system and process, in one embodiment, a user marks regions representing different facial components on the first frame, such as, the eyes, eyebrows and lip regions. Pixels in the marked regions are then used to train local color models for facial components. Specifically, in one embodiment, the automated face enhancement system trains each component based on training a positive color Gaussian Mixture Model (GMM) for pixels within the user-marked regions for each facial component. A negative color GMM model is trained by using pixels around the facial component in question, but not in it. This type of training occurs for eye color, eyebrow color, the skin color and lip color, for example. An example of determining the skin color will be discussed in greater detail in the section below. Alternately, predetermined local color models can simply be specified for the facial components.

Additionally, in one embodiment, the automated face enhancement system and technique uses a rule-based filtering approach in which a user only sets up the desired cosmetic filters to be applied. For example, the user can choose the combination and strengths of cosmetic filters to be applied for any or all of the facial components.

2.2 Facial Components Classification.

The following paragraphs provide additional details on the classification of different facial components.

2.2.1 Skin Region Detection.

The automated face enhancement system starts to build the initial classification map for a given current frame by first determining the skin region inside the face bounding box. Once the skin region is calculated, it can help locate the eyes and facial components relative to the eyes because only the non-skin regions inside the face bounding box are searched for purposes of eye tracking. However, accurately identifying the skin region is not an easy task since people may have quite different skin colors, and more importantly, under bad illumination conditions, different parts of the skin region may have quite different appearances due to shadows and highlights. Directly applying generic statistical skin color models is not sufficient to accurately classify the skin region, as shown in the example in FIG. 5(b). To solve this problem, a two-step skin region detection procedure is employed to get an accurate skin color model for the input sequence.

Figure 5:
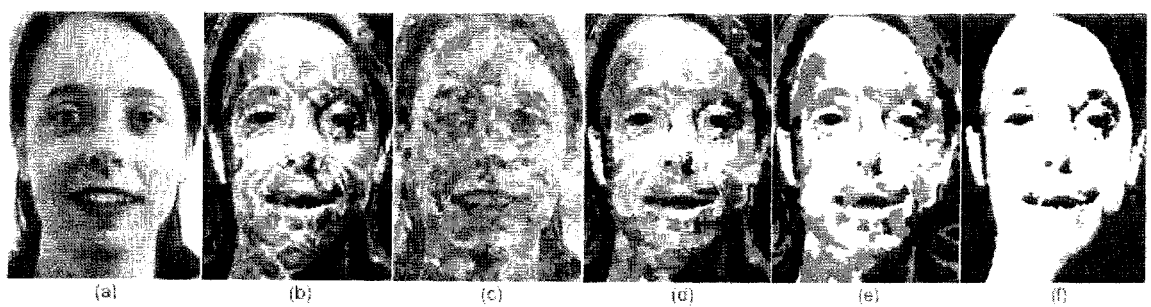
FIG. 5(a) depicts an original face in an image frame.
FIG. 5(b) shows how the generic skin color model proposed in another system cannot classify skin regions very well in this frame.
FIG. 5(c) shows mean-shift over-segmentation processing to an image.
FIG. 5(d) depicts a region-level skin probability map.
FIG. 5(e) depicts an image after adaptive thresholding. White pixels are skin pixels, black pixels are non-skin pixels and grey ones are unknown.
FIG. 5(f) depicts a final classification map for skin regions based on local Gaussian Mixture Models (GMMs).
Figure 6:
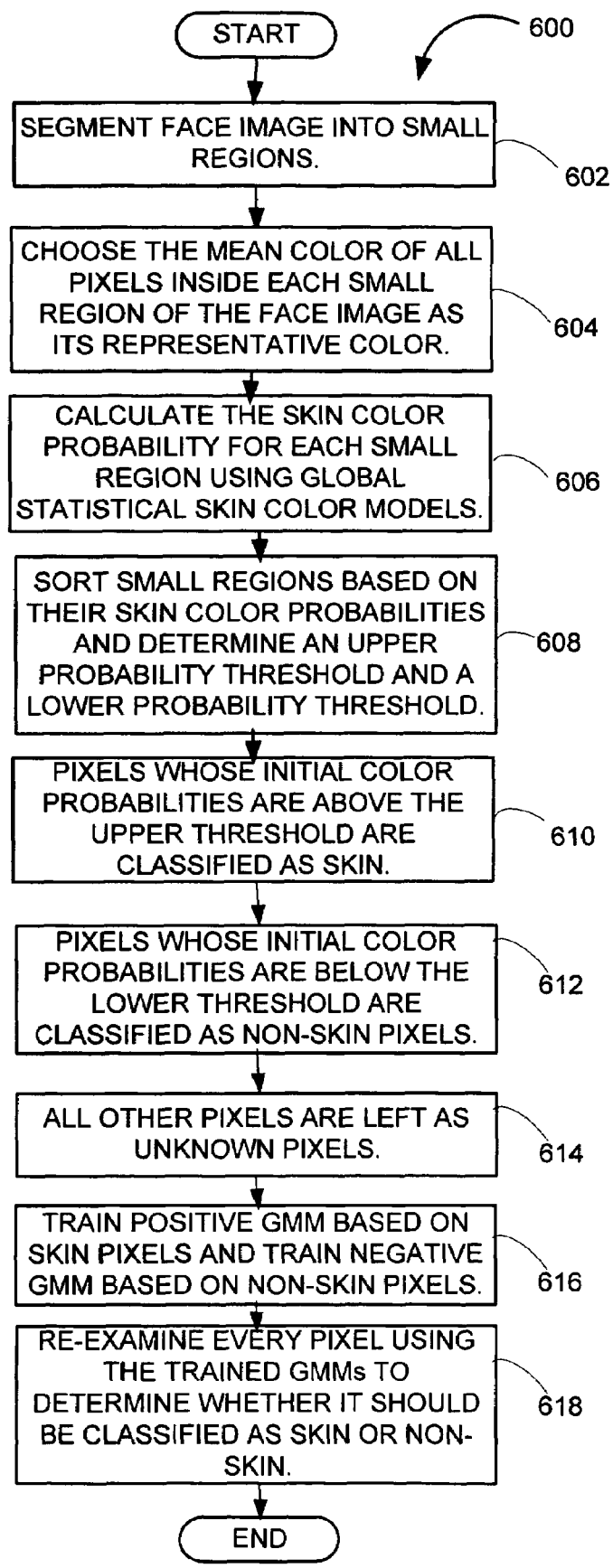
FIG. 6 depicts a flow chart of the skin/non-skin classification process employed by one embodiment of the automated face enhancement system.

The first step is region-level classification, an example of which is shown in FIG. 5(c). As shown in FIG. 6, process action 602, the face image is segmented. in one embodiment, a mean shift image segmentation procedure is used to over-segment the face image into small regions, denoted as $R_i$. To determine the skin region inside the face bounding box, for each region the mean color of all pixels inside this region is chosen as its representative color (process action 604), and a skin color probability $P(R_i)$ is calculated for $R_i$ by using global statistical skin color models (process action 606). An example of a skin color probability map is shown in FIG. 5(d).

The second step is pixel-level classification. The regions are sorted based on their skin color probabilities, and an upper probability threshold $T_h$ is determined so that $U\{R_i, P(R_i) > T_h\} \approx 0.4 * R_f$, where $U(R_i)$ is the total size of the union of regions and $R_f$ is the size of the face bounding box. Similarly, as shown in process action 608, a lower probability threshold $T_l$ is determined by $U\{Ri, P(R_i) < T_l\} \approx 0.2 * R_f$. All pixels whose initial skin color probabilities are larger than $T_h$ are treated as definite skin pixels (process action 610), and those whose probabilities are lower than $T_l$ are treated as definite non-skin pixels (process action 612). All other pixels are left as unknown pixels (process action 614). An example of the pixel level classification result is shown in FIG. 5(e).

The automated face enhancement system then trains a positive Gaussian Mixture Model (GMM) in RGB space based on skin pixels, and trains a negative GMM based on non-skin pixels (process action 616). Both of these GMMs contain 5 Gaussians. The automated face enhancement system then re-examines every pixel using these models. For a pixel q, its probability of being skin colored is calculated as $P_s^q/(P_s^q + P_{n-s}^{q\text{TM}})$, where $P_s^q$ is the likelihood computed from the positive skin color GMM, and $P_{n-s}^q$ is the likelihood computed from the negative GMM (process action 618). In this way the automated face enhancement system can softly classify pixels in the face bounding box into skin region and non-skin region, an example of which is shown in FIG. 5(f).

2.2.2 Eye Tracking

Tracking the eyes in video sequences is a challenging task since the size, color and appearance of eyes can be dramatically different for different users, especially under undesirable illumination conditions. Even in the same sequence, the user will blink periodically, resulting in a dramatically change on the appearance of eye regions. In one embodiment of the automated face enhancement system a template-matching based eye tracking procedure which can accurately track the eyes in a sequence after initialization, and is also able to detect eye blinks to avoid lost tracking, is used.

Figure 7:
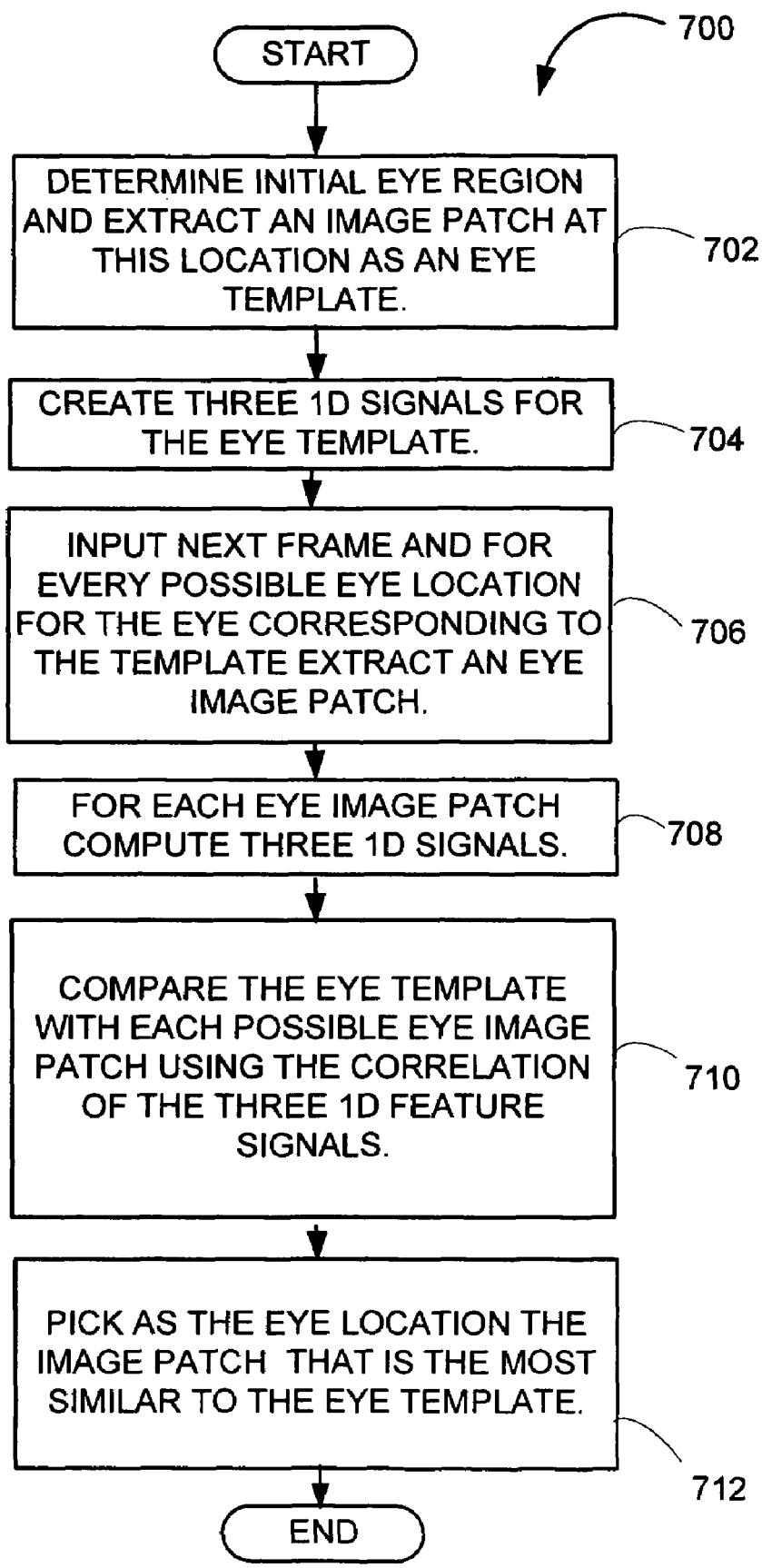
FIG. 7 depicts a flow chart depicting an eye tracking process employed in one embodiment of the automated face enhancement system.

Generally, the eye tracking procedure of one embodiment of the automated face enhancement system and process is shown in FIG. 7. The processing shown is for one eye, but the same processing is applied to each eye area. The initial eye region as specified during initialization is used to extract an image patch of an open eye which becomes an eye template, as shown in process action 702. Three one dimensional (1D) feature signals are determined for this eye template (process action 704). The next frame is input and for every possible eye location corresponding to the eye template an eye image patch is extracted, as shown in process action 706. In one embodiment, only non-skin regions within the face bounding box are considered for the possible eye locations. For each eye image patch that is extracted three feature signals are computed (process action 708). The eye template is compared with each possible eye image patch using the correlation of the three 1D feature signals of each (process action 710). The eye image patch that is the most similar to the eye template is then determined to be the eye location, as shown in process action 712. It should be noted that this process discards eye blinks because the correlation between the three 1D features of the eye template and the eye image patch that contains a closed or blinking eye will not be great.

Figure 8:
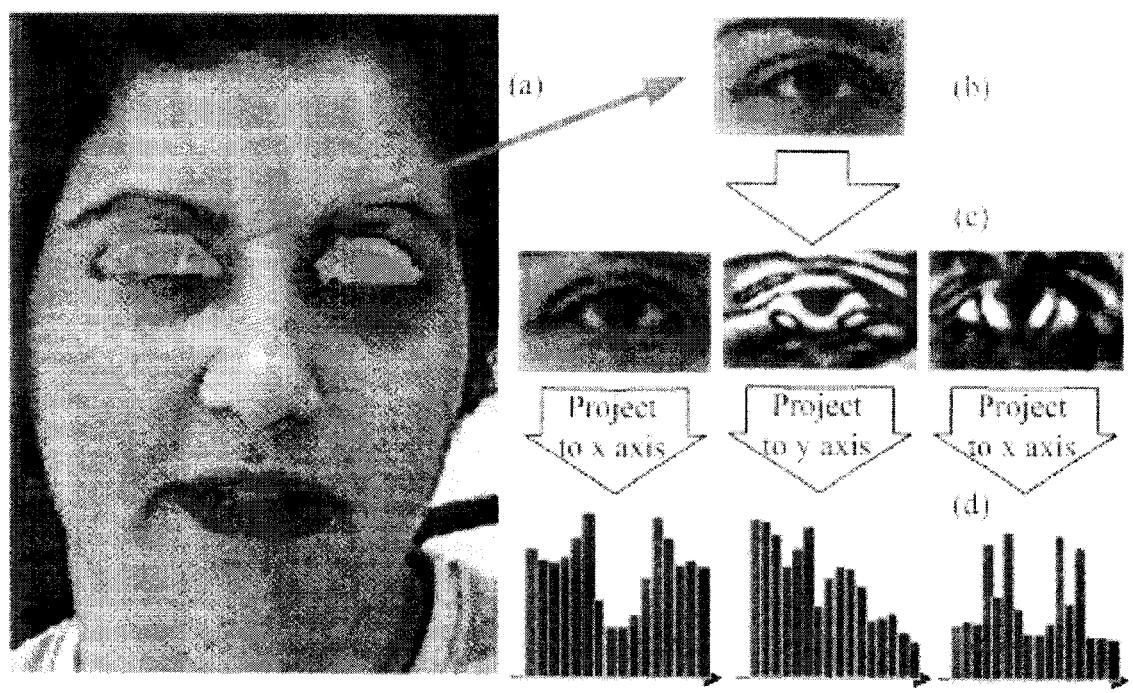
FIG. 8(a) depicts a user-marked eye, eyebrow and lip regions in an initial image frame.
FIG. 8(b) depicts an extracted left eye template.
FIG. 8(c) depicts three grayscale feature patches.
FIG. 8(d) depicts three 1D feature signals that are used to determine correlation to the eye template.

More specifically, an eye template, which in one embodiment of the automated face enhancement system is generally defined by a user during system initialization (an example of the user marking the eye regions on initialization is shown in FIG. 8(*a*)), is an image patch $I^0(x_c^0, y_c^0, W, H)$, where $x_c^0$ and $y_c^0$ are centroid coordinates and W and H is the size of the patch. On a later frame $F_t$, for every possible eye location $(x^t, y^t)$, the system extracts an image path $I^t(x^t, y^t, H)$ and compares the distance between $I^0$ and $I^t$. In one embodiment, the eye location on frame $F_t$ is determined as $$(x_c^t, y_c^t) = \arg\max_{x^t, y^t} D(I^0, I^t), \text{ if } \max D(I^0, I^t) > d_m \text{ and} \quad (1)$$

$$(x_c^{t-1}, y_c^{t-1}), \text{ otherwise,}$$

where $D(I^0, I^t)$ is the similarity measurement between two image patches and $d_m$ is a pre-defined threshold used to detect eye blinks. One can imagine that when an eye blink happens on frame $F_t$, the maximum similarity max $D(I^0, I^t)$ will be significantly lower than usual, thus the system will ignore matching results on frame $F_t$, which is potentially erroneous, and stabilize the eye locations by using the last frame's eye positions. Note that $x_c^t$ and $y_c^t$ are relative coordinates to the face bounding box, thus even when an eye blink happens, the eye positions will still move along with the face bounding box.

The definition of $D(I^0, I^t)$ impacts the success of the eye tracking procedure employed. Directly computing pixel-wise Euclidian distances is not an optimal way of measuring the similarity between two image patches. Instead, the automated face enhancement system and process uses a feature-based matching procedure to measure the similarity. For a color image patch I, one embodiment of the automated face enhancement system computes three grayscale feature patches from it: the gray scale version of the image patch $I_g$, the horizontal edge map $I_h$ and the vertical edge map $I_v$, which are computed by applying Sobel filters on $I_g$, as shown in FIG. 8(*c*). The system and process further projects the three feature patches onto the x (for $I_g$ and $I_v$) or y (for $I_h$) axis to create three 1D signals as final features of the original image patch, denoted as $S_g^I$, $S_h^I$ and $S_v^I$, respectively, as shown in FIG. 8(*d*). The similarity between two image patches are defined as $$D(I^0, I^t) = \omega_G \cdot Cr(S_g^{I^0}, S_g^{I^t}) + \omega_H \cdot Cr(S_h^{I^0}, S_h^{I^t}) + \omega_V \cdot Cr(S_v^{I^0}, S_v^{I^t}) \quad (2)$$

where $\omega_G$, $\omega_H$ and $\omega_V$ are predefined weights. In one embodiment of the automated face enhancement system these are set to 0.4, 0.3 and 0.3, respectively. Cr(A,B) are 1 D signal correlation functions defined as $$Cr(A, B) = \sum_{i=1}^{L} (a_i, b_i) / \sqrt{\sum_{i=1}^{L} a_i^2 \sum_{i=1}^{L} b_i^2} \quad (3)$$

where L is the length of the signal.

Since the template matching is achieved based on calculating 1D signal correlations, it can be done very efficiently. Furthermore, as discussed previously, in one embodiment of the automated face enhancement system and process, the eye searching windows are constrained based on the face tracking box, and inside a searching window only those pixels which are not classified as skin pixels to be candidates of eye centroid points are examined, thus further reducing the computational time.

Figure 9:
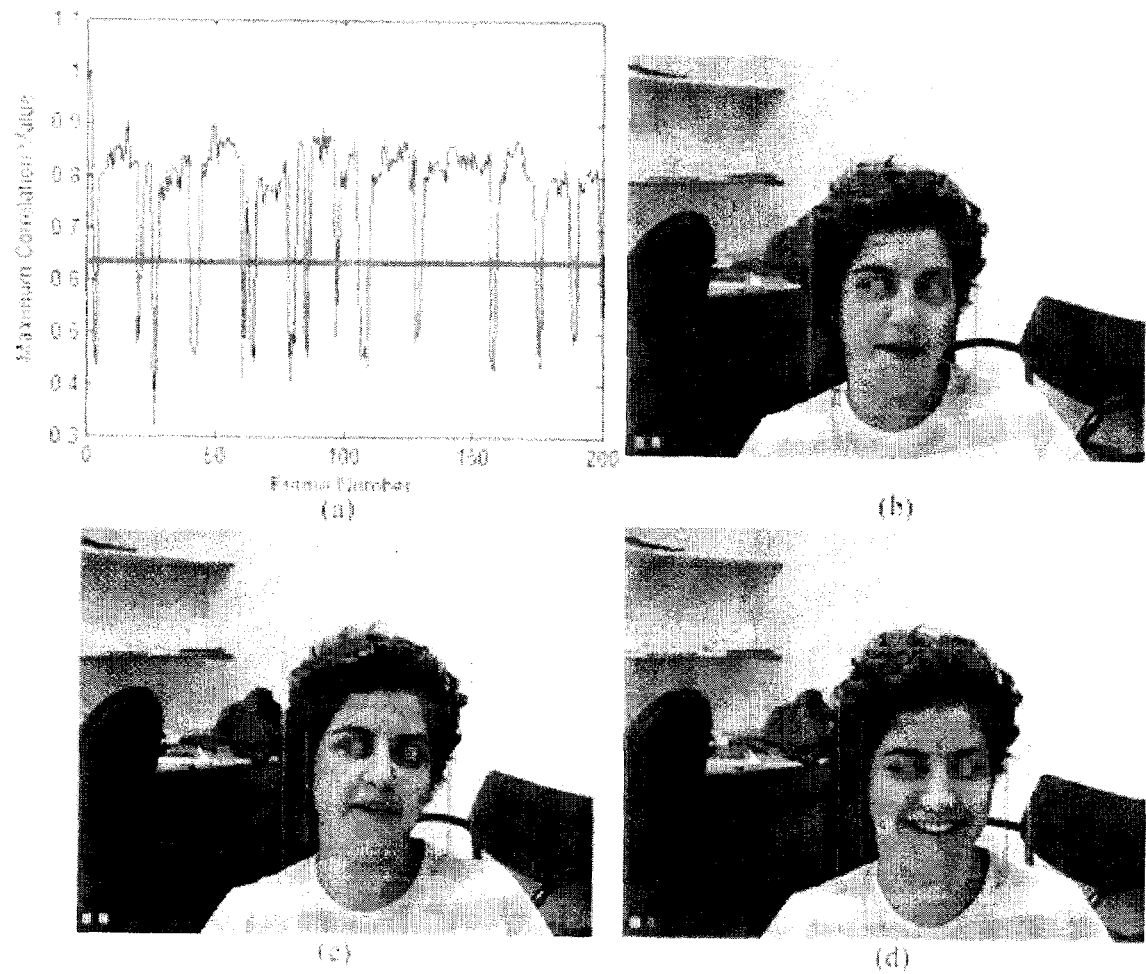
FIG. 9(a) depicts maximum similarity values on matching the left eye template in a video sequence.
FIGS. 9(b), 9(c) and 9(d) depict eye tracking results. Note that for frame 9(d) an eye blink is detected.

FIG. 9(*a*) shows the maximum similarity values on matching the left eye template to each frame in a video sequence, and FIGS. 9(*b*), 9(*c*) and 9(*d*) show eye tracking results on some frames of the video. One can see that the eye blinks can be easily distinguished by applying a threshold on the correlation values thus the eye tracker of the automated face enhancement system is robust to handle outliers.

2.2.3 Local Classification

Once the eye positions are determined, the automated face enhancement system further softly classifies pixels around the eye regions into three components: eye, eyebrow and under eye shadow. It also roughly determines a mouth bounding box based on eye positions and softly classifies pixels inside it to be lip and non-lip ones. Similar to the skin color detection, these local classification tasks are achieved by applying local color models. Specifically, as discussed previously related to initialization, the automated face enhancement system trains a positive eye color GMM model based on user marked eye pixels such as those shown in FIG. 8(*a*). A negative eye color GMM model is trained by using not-marked pixels around the eye region. The same method is used to train a positive and a negative eyebrow color GMM, and a positive and a negative lip color GMM. By using these local color models inside the eye and mouth regions, the automated face enhancement system and method can generate a soft classification map $C_t^1$ 312 as shown in FIG. 3.

2.3 Temporal Smoothing

To avoid making classification decisions incoherently across frames, the automated face enhancement system applies a temporal smoothing operation to temporally stabilize the classification map before applying cosmetic filters. In one embodiment, the automated face enhancement system and process first aligns the face bounding boxes in frame $F_{t-1}$ and $F_t$, and computes a forward pixel-wise optical flow from face image at t−1 to face image at t using a conventional approach. Based on the computed optical flow the automated face enhancement system warps the classification map $C_{t-1}$ to the current face position by compensating the motion, resulting in a new map $C_{t-1}{}^{\omega}$. The final classification map $C_t$ for frame $F_t$ is calculated as a linear interpolation between $C_t{}^1$ and $C_{t-1}{}^{\omega}$ as $$C_t = \alpha C_{t-1}{}^{\omega} + (1-\alpha) C_t{}^1 \quad (4)$$

where $\alpha$ is set to 0.4 in one embodiment of the system. This simple yet efficient regression procedure, sometimes called "Moving Averages", is able to tone down the fluctuations of classification results to a smoothed trend through time.

2.4 Cosmetic Filtering

Once the final classification map for the current frame has been computed, a set of cosmetic filters is used to apply makeup effects on the different facial components defined by the map. The user defines the makeup effects by selecting certain parameters as will be described shortly. The user can choose to use all or any combination of the cosmetic filters for an input video. In the following paragraphs the use of the skin filter is described as an example to demonstrate how the filters work. Other filters can be applied in a similar fashion.

For each pixel q, defined by the final classification map to be in the skin region, its probability of belonging to the skin region is denoted as $P_q$, Specifically, a positive skin color GMM model $G_{skin}{}^+$, and a negative skin color GMM model $G_{skin}{}^-$ are calculated. For a given pixel q, one can calculate a likelihood that its color is skin color by using the positive model, denoted as $L^+$. In the same way one can calculate a likelihood that the color of the pixel is not a skin color by using the negative GMM, denoted as $L^-$. The final probability is calculated as $$P_q = \frac{L^+}{L^+ + L^-}.$$

For each pixel, its distance to the nearest non-skin pixel $q_n$ ($P_{q_n}=0$) is denoted as $d_q$. A filter strength $W_q$ is defined as $$W_q = W_{max} \cdot P_q \cdot (1 - \exp(-d_q{}^2/\sigma^2)) \quad (5)$$

where $W_{max}$ is the maximum strength defined by the user, and $\sigma$ is the factor to control how smoothly the filter is to be eased out.

The filtering is carried out by blending pixel q with a target color $C^*_q$ as $$C_q^f = W_q C^*_q + (1-W_q) C_q \quad (6)$$

where $C_q$ is the original color, and $C_q^f$ is the result color after filtering. The target color $C^*_q$ has different definitions for different facial components. For the lip region, it can be defined as a constant lip color. For the eyebrow region, it can be defined as black in order to darken the eyebrows. For both the skin region and the under eye shadow region, it can be defined as the average skin color computed from the skin classification process. In the last case, the difference is that for the skin region, the automated face enhancement system pulls pixels toward the average skin color with low strength, while for the under eye shadow region, the automated face enhancement system pulls pixels toward the average skin color with high strength (i.e., $W_q$ is increased) to purposely remove the shadows under the eyes.

A separate cosmetic filter is applied to the eyes which sharpens the features in the eye regions. More specifically, $C^*_q$ is defined per pixel for the eyes by convolving the eyes with a standard sharpening mask.

It should be noted that any or all of the aforementioned alternate embodiments may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A process for enhancing the appearance of a face in an image in an image sequence, comprising the process actions of:
    (a) identifying facial components in an initial image frame of the image sequence and determining local color models for each of these facial components;
    (b) inputting a subsequent image frame of the image sequence as the current image frame;
    (c) locating face and eye locations in the current image frame;
    (d) classifying pixels of the face of the current image frame of the image sequence into different facial components using the local color models and the face and eye locations to produce an initial classification map for the current image frame;
    (e) temporally smoothing the pixels of the initial classification map of the current image frame of the image sequence using a final classification map of an immediately previous image frame of the image sequence by employing a forward pixel-wise optical flow and a moving averages computation to create a final classification map of the current image frame; and
    (f) applying cosmetic filters to facial components defined in the final classification map of the current image frame to produce an enhanced image of the face for the image sequence.

2. The process of claim 1 wherein process actions (b) through (f) are repeated on subsequent image frames of the image sequence.

3. The process of claim 1 wherein the process action for locating the face and eye location comprises;
    locating the face with a face detector;
    determining skin and non-skin regions in the location of the face; and
    searching the non skin regions of the located face using an eye template for each eye to determine the location of the eyes.

4. The process of claim 3 wherein the process action for determining the skin and non-skin regions of the face comprises;
    dividing the face location into small regions;
    determining a mean color for each small region and using this mean color as a representative color for the corresponding small region;
    calculating a skin color probability for each small region using global statistical skin color models;
    sorting the small regions based on their skin color probabilities;
    determining an upper probability threshold;
    determining a lower probability threshold;
    designating all pixels whose skin color probabilities are greater than the upper probability threshold as skin pixels;
    designating all pixels whose skin color probabilities are less than the lower probability threshold as non-skin pixels;
    designating all other pixels as unknown pixels;

training a positive Gaussian Mixture Model based on skin pixels;

training a negative Gaussian Mixture Model based on non-skin pixels;

re-examining every pixel of the face location using the positive and negative Gaussian Mixture Models to determine if that pixel is a skin or non-skin pixel.

5. The process of claim 1 wherein the process action of locating the eye locations comprises, for each eye, the process actions of:

defining an image patch that defines an eye template in an initial image frame;

for the eye template, computing a gray scale image, a horizontal edge map and a vertical edge map;

creating three one dimensional (1D) signals of the eye template using the grayscale image, the horizontal edge map, and the vertical edge map;

inputting a subsequent frame as the current frame and for every possible eye location in the current frame extracting an eye image patch;

for each eye image patch in the current frame, computing a gray scale image, a horizontal edge map and a vertical edge map;

creating three 1D signals of the each eye image patch using the grayscale image, the horizontal edge map, and the vertical edge map;

comparing the eye template with the eye image patch to determine the amount of correlation using the three 1D signals; and choosing as the current eye location the current image patch that is most closely correlated to the eye template patch.

6. The process of claim 1 wherein the local color models are manually specified by a user for each of the facial components.

7. The process of claim 1 wherein the local color model for each facial component is trained using positive and negative Gaussian Mixture Models.

8. The process of claim 1 wherein the process action of temporally smoothing is performed using a moving averages regression technique.

9. The process of claim 1 wherein a given facial component comprises an eye, eyebrows, under eye shadows or lips.

10. The process of claim 1 wherein the process action of applying cosmetic filters is carried out by blending a target color with each pixel of a given facial component in the final classification map.

11. A computer-readable medium having computer-executable instructions for performing the process recited in claim 2.

12. A system for improving the visual quality of a face in an image frame, comprising:

a general purpose computing device;

a computer program comprising program modules executable by the general purpose computing device, wherein the computing device is directed by the program modules of the computer program to, input an image frame of an image sequence;

determine the location of the face in the image frame;

determine the position of the eyes and mouth in the image frame;

classify each pixel of the face of the input frame of the image sequence into face components using the location of the face and eyes and color models for each of the face components;

temporally smooth the classified pixels of the input frame of the image sequence using classified pixels of a previous image frame in the image sequence by employing a forward pixel-wise optical flow and a moving averages computation; and apply one or more cosmetic filters to the smoothed classified pixels to output an enhanced image frame for the image sequence.

13. The system of claim 12 further comprising a program module to bilaterally filter the input image prior to determining the location of the face.

14. The system of claim 12 wherein the location of the eyes is determined by:

defining an eye template;

for the eye template the one dimensional signals;

inputting a subsequent image frame and for every possible eye location in the subsequent frame extracting an eye image patch;

for each eye image patch in the current frame, computing three 1D signals;

comparing the eye template with the eye image patch to determine the amount of correlation using the three 1D signals; and choosing as the current eye location the eye image patch that is most closely correlated to the eye template.

15. The system of claim 12 wherein the one or more cosmetic filters are applied to a combination of the eyes, eye brows, lips or shadows around the eyes.

16. The system of claim 12 wherein the program module to apply one or more cosmetic filters to the smoothed classified pixels, comprises sub-modules to:

determine a filter strength weight based on a maximum filter strength and the probability that a pixel is classified as a given component;

blending each smoothed classified pixel with a target color for the given component using the filter strength weight.

17. The system of claim 16 wherein the target color is different for different facial components.

18. The system of claim 17 wherein:

for a facial component comprising an eye, the target color is the color of the eye after applying a sharpening filter;

for a facial component comprising an eyebrow, the target color is black;

for a facial component comprising lips, the target color is a constant pre-defined color;

for a skin region, the target color is an average color of skin; and for an under eye region, the target color is an average color of the skin.

19. A computer-implemented process for enhancing a face in a video frame in a video sequence, comprising the process actions of:

describing color models for different components of the face;

inputting a video frame of a video sequence;

locating face and eye locations in the video frame;

classifying pixels of the face into different facial components for the input video frame of the video sequence using the color models and the face and eye locations;

temporally smoothing the classified pixels of the face in the input video frame with the classified pixels of the face in a previous frame of the video sequence by employing a forward pixel-wise optical flow and a moving averages computation;

applying cosmetic filters to different facial components in the video frame to produce an enhanced image of the face.

* * * * *